United States Patent
Arakawa et al.

(10) Patent No.: US 12,381,495 B2
(45) Date of Patent: Aug. 5, 2025

(54) PULSE GENERATOR

(71) Applicant: BROTHER KOGYO KABUSHIKI KAISHA, Nagoya (JP)

(72) Inventors: Yuta Arakawa, Nagoya (JP); Haruhisa Shirai, Kasugai (JP); Nobumasa Tanaka, Nagoya (JP); Shoji Sato, Okazaki (JP); Masahiro Hoga, Ogaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 233 days.

(21) Appl. No.: 18/307,134

(22) Filed: Apr. 26, 2023

(65) Prior Publication Data
US 2023/0347643 A1 Nov. 2, 2023

(30) Foreign Application Priority Data
Apr. 28, 2022 (JP) ................................ 2022-074981

(51) Int. Cl.
H02P 6/10 (2006.01)
B41J 2/045 (2006.01)
H04N 1/047 (2006.01)

(52) U.S. Cl.
CPC ............ *H02P 6/10* (2013.01); *B41J 2/04573* (2013.01); *B41J 2/04586* (2013.01); *H04N 1/047* (2013.01)

(58) Field of Classification Search
CPC .. B41J 2/04586; B41J 19/202; B41J 2/04573; B41J 19/207; H04N 1/047; H02P 6/10
USPC .................................................... 318/400.23
See application file for complete search history.

(56) References Cited

U.S. PATENT DOCUMENTS

| | | | |
|---|---|---|---|
| 2008/0080013 A1 | 4/2008 | Akiyama | |
| 2011/0193930 A1* | 8/2011 | Ogura | G01D 5/34715 250/231.13 |
| 2012/0056933 A1* | 3/2012 | Tanaka | B41J 29/38 347/30 |
| 2013/0278664 A1* | 10/2013 | Arakane | B65H 7/20 271/10.11 |
| 2014/0092153 A1* | 4/2014 | Kikkawa | B41J 13/0009 347/5 |
| 2016/0089886 A1* | 3/2016 | Mizutani | B41J 2/16511 347/32 |
| 2017/0232771 A1* | 8/2017 | Ito | B41J 11/42 347/19 |

(Continued)

FOREIGN PATENT DOCUMENTS

JP 2008-92340 A 4/2008
JP 2013-123827 A 6/2013

*Primary Examiner* — Gabriel Agared
(74) *Attorney, Agent, or Firm* — Scully, Scott, Murphy & Presser, PC

(57) ABSTRACT

There is provided a pulse generator generating a timing pulse based on a detection signal obtained from a detection signal outputting part configured to output the detection signal every time a motor rotates by a predetermined amount which has been previously set. The pulse generator includes: a time information calculating part, and a timing determining part. A time difference between a first calculating timing at which first time information is calculated and a second calculating timing at which second time information is calculated is longer than a time required for the motor to rotate by not less than an angle corresponding to a cogging distance.

16 Claims, 13 Drawing Sheets

(56) References Cited

U.S. PATENT DOCUMENTS

2022/0314666 A1* 10/2022 Arakane .................... B41J 2/01
2023/0350615 A1* 11/2023 Kitai ....................... G06T 7/001

* cited by examiner

PULSE GENERATOR

REFERENCE TO RELATED APPLICATIONS

This application claims priority from Japanese Patent Application No. 2022-074981 filed on Apr. 28, 2022. The entire content of the priority application is incorporated herein by reference.

BACKGROUND ART

There is a publicly known image forming apparatus configured to use a linear encoder which outputs a pulse signal in accordance with movement of a carriage which moves, by driving of a motor, on a previously set moving path so as to detect the position and the moving speed of the carriage, thereby controlling an ink discharging timing (ink ejecting timing) of a recording head mounted on the carriage.

DESCRIPTION

The linear encoder is provided with a linear scale in which encoder slits are formed at a predetermined interval along a moving direction of the carriage, and is configured to detect the position of the carriage by using this linear scale. Accordingly, the linear encoder is capable of directly recognizing the position of the carriage, and has such an advantage that the precision in detection of the position and the moving speed of the carriage is high. The linear encoder, however, is arranged at a location near the recording head which is mounted on the carriage, and thus, in a case for example that the linear encoder breaks down and the linear encoder is to be exchanged, there is such a problem that the recording head becomes a hindrance to an exchanging operation of the linear encoder, which in turn makes execution of the exchanging operation of the linear encoder to be difficult.

In view of this, it is possible to solve the above-described problem by using a rotary encoder attached to a motor shaft of the motor driving the carriage so as to detect the position and the moving speed of the carriage.

The usage of the rotary encoder, however, leads to generation of any printing unevenness which is not generated in the case of using the linear encoder, thereby lowering the image quality, in some cases.

An object of the present disclosure is to improve the image quality of the image forming apparatus.

According to an aspect of the present disclosure, there is provided a pulse generator configured to generate a timing pulse based on a detection signal obtained from a detection signal outputting part configured to output the detection signal every time a motor rotates by a predetermined amount which has been previously set, the pulse generator including: a time information calculating part and a timing determining part.

The time information calculating part is configured to calculate time information, indicating a time interval between the detection signal output most recently and the detection signal output a previous time which is prior to the detection signal output most recently, every time the detection signal is output from the detection signal outputting part.

The timing determining part is configured to determine an output timing, at which the timing pulse is output, based on at least two pieces of the time information.

Further, a time difference between a first calculating timing at which first time information is calculated and a second calculating timing at which second time information is calculated is longer than a time required for the motor to rotate by not less than an angle corresponding to a cogging distance. The first time information is the time information, of the at least two pieces of the time information, output based on a first detection signal which is the detection signal output earliest. The second time information is the time information, of the at least two pieces of the time information, output based on a second detection signal which is the detection signal output latest.

The cogging distance is a value obtained by dividing an angle required for the motor to make one rotation (namely, 360 degrees) with a product of a number (quantity) of a magnet of a stator of the motor and a division number by which a rotor of the motor is divided.

In a case that a timing pulse, indicating a discharging timing at which a discharging apparatus moved by a conveying apparatus that is driven by the motor discharges or ejects an ink toward a sheet, is generated, the pulse generator, of the present disclosure, which is configured in such a manner is capable of suppressing any deviation in the discharging timing, caused due to the cogging variation (cogging fluctuation) of the motor, and of suppressing the generation of the printing unevenness, thereby making it possible to improve the quality of the image of the image forming apparatus.

FIRST EMBODIMENT

In the following, a first embodiment of the present disclosure will be explained, with reference to the drawings.
<Overall Configuration>

Figure 1:
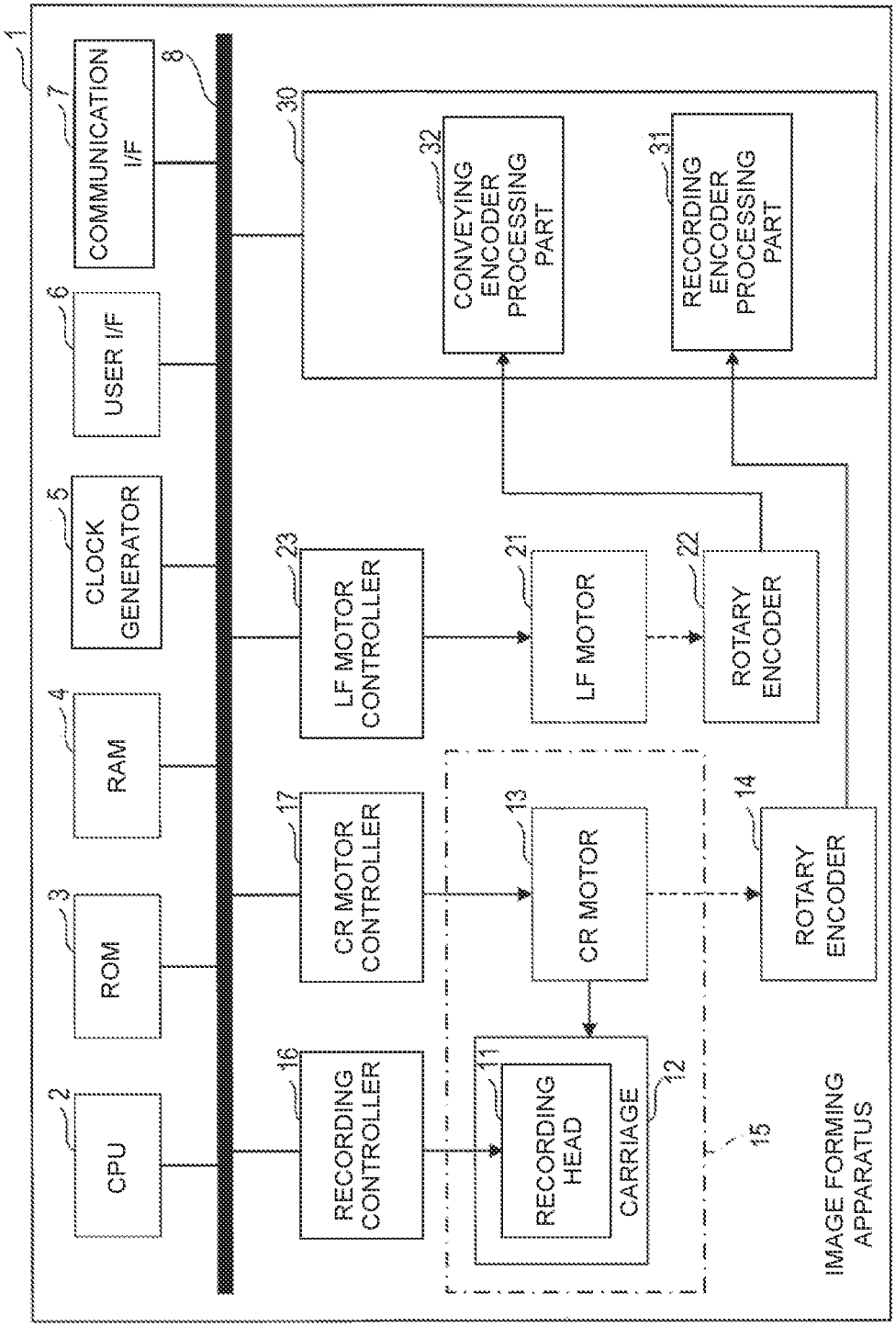
FIG. 1 is a block diagram depicting the configuration of an image forming apparatus.

An image forming apparatus 1 of the present embodiment is an ink-jet printer; as depicted in FIG. 1, the image forming apparatus 1 is provided with a recording head 11, a carriage 12, a carriage motor 13 and a rotary encoder 14.

The recording head 11, the carriage 12 and the carriage motor 13 construct a part of a printing mechanism 15.

The printing mechanism 15 is configured to receive a power from the carriage motor 13 and to thereby move the carriage 12 having the recording head 11 mounted thereon in a main scanning direction. The main scanning direction is a direction orthogonal to a sub scanning direction in which a sheet (a paper sheet, paper) is conveyed.

The recording head 11 is a discharging head configured to discharge or eject a liquid droplet of an ink (ink liquid droplet; ink droplet), and is a so-called ink-jet head. The recording head 11 executes a discharging operation of the ink droplet, in a case that the carriage 12 moves so as to cross or traverses the sheet along the main scanning direction, to thereby form an image on the sheet. The carriage motor 13 is a direct current motor, and functions as a driving source to reciprocally move the carriage 12.

The rotary encoder 14 is an optical rotary encoder of an incremental type, and is used to measure a position in the main scanning direction and a speed of the carriage 12.

The image forming apparatus 1 is further provided with a line feed motor 21 and a rotary encoder 22 so as to realize conveyance of the sheet. The line feed motor 21 is a direct current motor, and functions as a driving source for rotating a conveying roller which conveys the sheet in the sub scanning direction. The rotary encoder 22 is an optical rotary encoder of the incremental type, and is used for measuring a rotation amount and a rotation speed of the conveying roller.

The image forming apparatus 1 is further provided with a CPU 2, a ROM 3, a RAM 4, a clock generator 5, a user interface 6, a communication interface 7, a bus 8, a recording controller 16, a carriage motor controller 17, a line feed motor controller 23 and an encoder processing part 30.

The CPU 2, the ROM 3, the RAM 4, the clock generator 5, the user interface 6, the communication interface 7, the recording controller 16, the carriage motor controller 17, the line feed motor controller 23 and the encoder processing part 30 are connected, via the bus 8, so that data can be input and output with respect to one another.

The CPU 2 is configured to integrally control the respective parts of the image forming apparatus 1. The ROM 3 stores a computer program executed by the CPU 2. The RAM 4 is used as a work space in a case that the computer program is executed by the CPU 2.

The clock generator 5 generates a clock signal of which period is sufficiently shorter than that of a pulse signal output by each of the rotary encoders 14 and 22, and outputs the clock signal to the respective parts inside the image forming apparatus 1.

The user interface 6 is provided with an operating part operable by a user and a displaying part capable of displaying various kinds of information to the user.

The communication interface 7 is an interface for performing data communication with respect to an external device or apparatus such as a personal computer, etc.

The recording controller 16 is configured to control the discharging operation of the ink droplet by the recording head 11. The carriage motor controller 17 is configured to control a conveying operation of the carriage 12 by the carriage motor 13. The line feed motor controller 23 is configured to control a conveying operation of the sheet by the line feed motor 21.

The encoder processing part 30 is provided with a recording encoder processing part 31 and a conveying encoder processing part 32.

The recording encoder processing part 31 determines a moving direction of the carriage 12 and measures a position and a moving speed of the carriage 12, based on an encoder signal input from the rotary encoder 14.

The conveying encoder processing part 32 determines a rotation amount and a rotation speed of the conveying roller which conveys the sheet, based on an encoder signal input from the rotary encoder 22.

Figure 2:
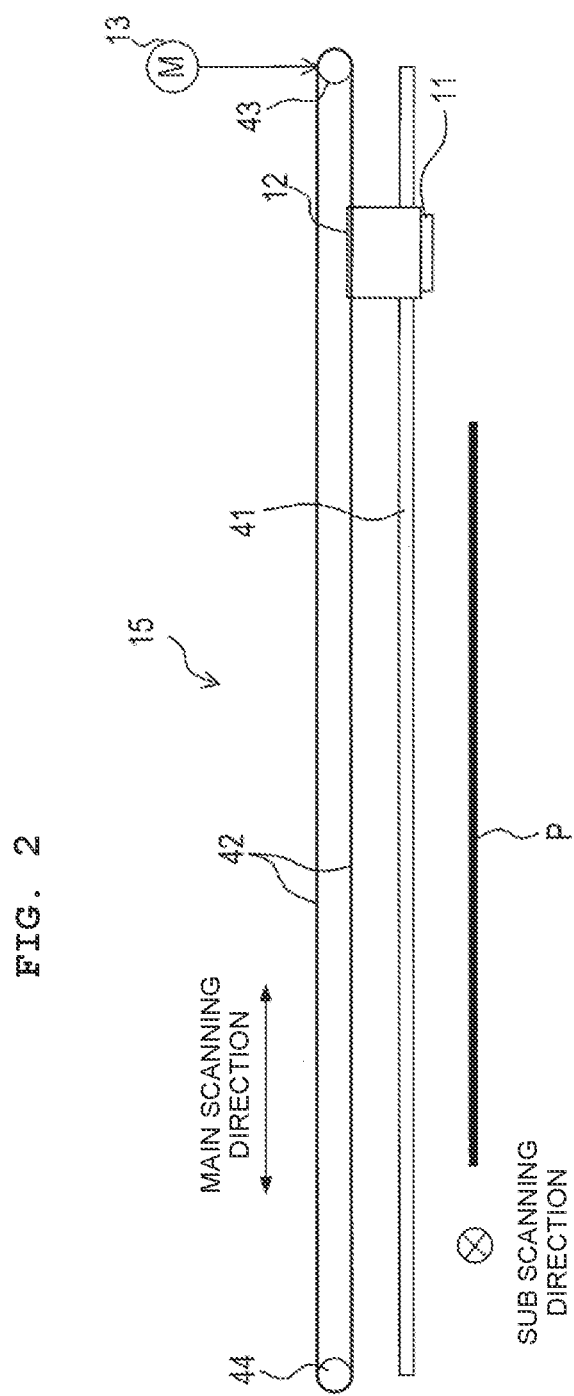
FIG. 2 is a view depicting the configuration of a printing mechanism.

As depicted in FIG. 2, the printing mechanism 15 is provided with a guide shaft 41 which extends in the main scanning direction so as to define a passage for the carriage 12. The carriage 12 is inserted into the guide shaft 41.

The carriage 12 is further connected to an endless belt 42 provided along the guide shaft 41. The endless belt 42 is wound around a driving pulley 43 arranged at one end of the guide shaft 41 and a driven pulley 44 arranged at the other end of the guide shaft 41.

The driving pulley 43 is driven and rotated by the carriage motor 13, and rotates or turn the endless belt 42. The carriage 12 moves in the main scanning direction along the guide shaft 41 by the power, of the carriage motor 13, transmitted to the carriage 12 through the rotation or turning of the endless belt 42.

The rotary encoder 14 is provided with a non-illustrated, disc-shaped encoder disc and a non-illustrated optical sensor.

The disc-shaped encoder disc is fixed to the carriage motor 13 so that the center of the disc-shaped encoder disc is arranged on the rotation axis of the carriage motor 13. In the encoder disc, a plurality of encoder slits arranged at equal intervals on concentric circles of the encoder disc are formed.

The optical sensor is provided with a light-emitting part which emits a light, and a light-receiving part which is arranged to face the light-emitting part, with the plurality of encoder slits intervened between the light-receiving part and the light-remitting part. With this, the rotary encoder 14 outputs, as an encoder signal, a first pulse signal (hereinafter referred to as an "A-phase signal") and a second pulse signal (hereinafter referred to as a "B-phase signal") having a predetermined phase difference therebetween (in the present embodiment, 90 degrees), in accordance with the rotation of the carriage motor 13, every time the carriage motor 13 makes a rotation by a predetermined amount which has been previously set.

<Cogging of Carriage Motor>

A torque during one rotation of a motor shaft in a direct current motor is not uniform, due to the structural reason of the direct current motor, even though the driving current or the driving voltage is constant, and a periodic torque fluctuation which is a so-called cogging, occurs. Due to this, the rotation speed of the direct motor fluctuates periodically.

Since the carriage motor 13 is the direct current motor, the rotation speed of the carriage motor 13 periodically fluctuates due to the cogging.

Figure 3:
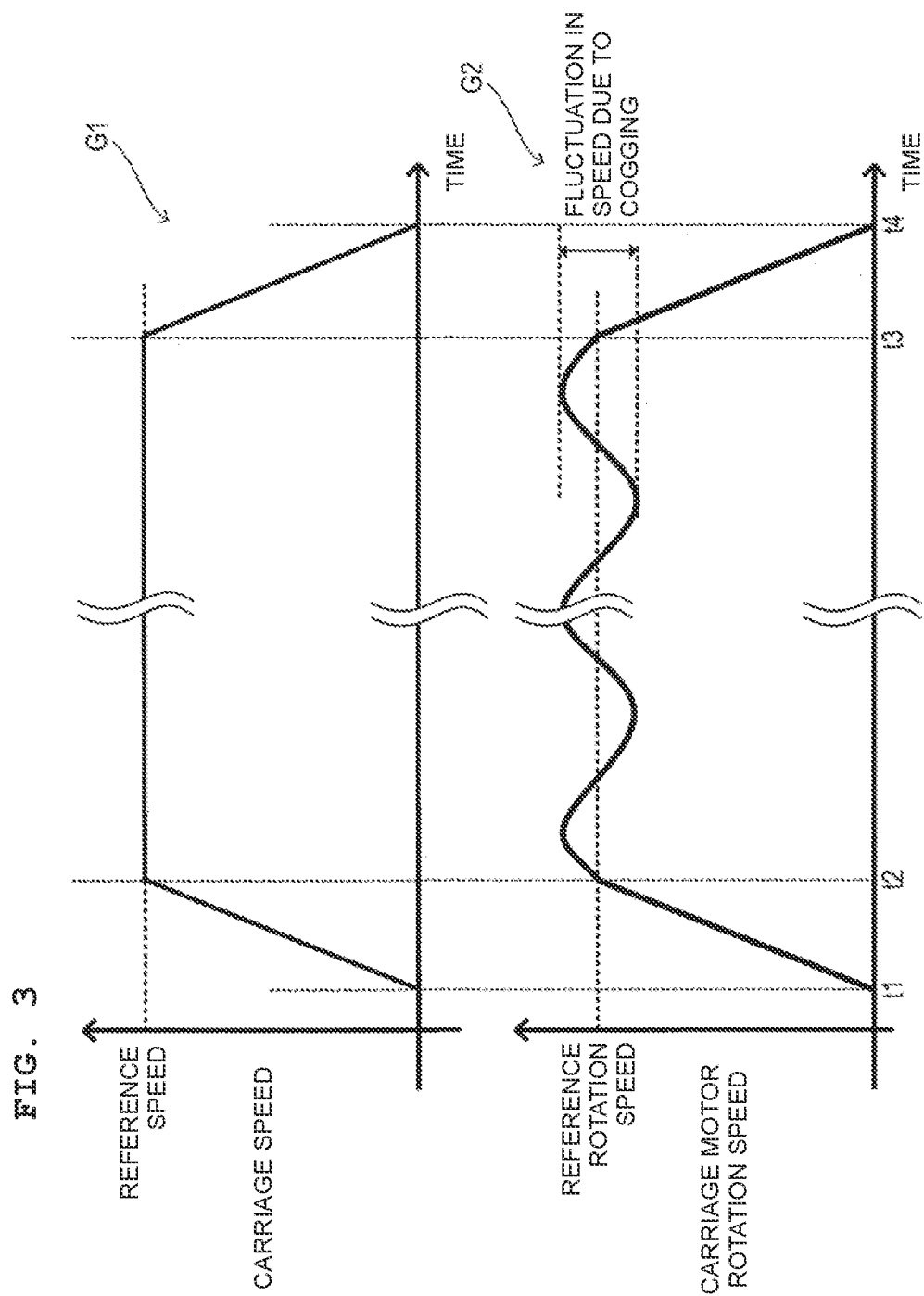
FIG. 3 is a graph indicating a temporal change of a carriage speed and a motor rotation speed.

For example, as depicted in a graph G1 of FIG. 3, the carriage 12 starts to accelerate at a time t1 from an acceleration staring position. Then, in a case that a moving speed of the carriage 12 (hereinafter referred to as a "carriage speed") reaches a reference speed at a time t2, the carriage 12 moves at a constant speed and at the reference speed, until the carriage 12 reaches a deceleration starting position.

In a case that the carriage 12 reaches the deceleration starting position at a time t3, the carriage 12 starts to decelerate. Then, the carriage speed becomes to be 0 (zero) at a time t4, and the carriage 12 stops at a stop position.

A graph G2 of FIG. 3 indicates a time change of a rotation speed of the carriage motor 13 (hereinafter referred to as a carriage motor rotation speed) in a case that the carriage 12 moves as depicted in the graph G1.

As indicated in the graph G2, the carriage motor 13 starts rotation driving at the time t1. Then, in a case that the carriage motor rotation speed reaches a reference rotation speed at the time t2, the carriage motor 13 is controlled by the carriage motor controller 17 so that the carriage motor 13 is rotary driven at the reference rotation speed. The carriage motor rotation speed, however, fluctuates (oscillates) at a cogging period due to the cogging, with the reference rotation speed as the center of fluctuation.

In a case that the carriage 12 reaches the deceleration starting position at the time t3, the carriage motor 13 starts to decelerate. Then, in a case that the carriage motor rotation speed becomes to be 0 (zero) at the time t4, and the carriage 12 stops at the stop position.

Note that the fluctuation in the carriage motor rotation speed due to the cogging (hereinafter referred to as a "cogging fluctuation") is attenuated by the endless belt 42 before being transmitted to the carriage 12 via the endless belt 42. Accordingly, the moving speed of the carriage 12 does not fluctuates (oscillates) at the cogging period, and the carriage 12 moves at the constant speed and at the reference speed.

<Configuration of Recording Encoder Processing Part>

Figure 4:
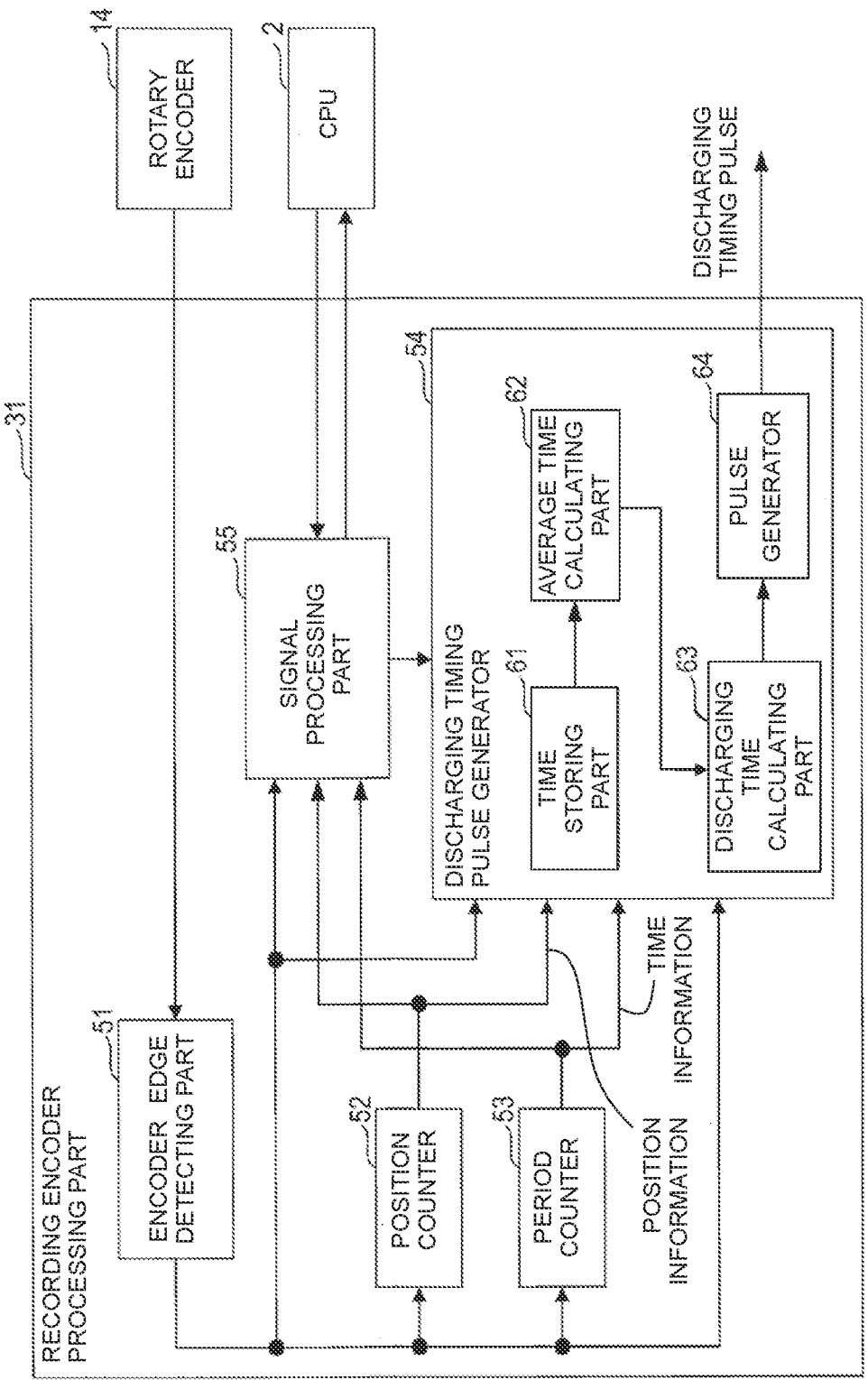
FIG. 4 is a block diagram depicting the configuration of a recording encoder processing part.

As depicted in FIG. 4, the recording encoder processing part 31 is provided with an encoder edge detecting part 51, a position counter 52, a period counter 53, a discharging timing pulse generator 54 and a signal processing part 55.

The encoder edge detecting part 51 takes in the respective phase pulse signals from the rotary encoder 14, and detects a rising edge of the A-phase signal and a rotating direction of the carriage motor 13. In a case that the encoder edge detecting part 51 detects the rising edge of the A-phase signal, the encoder edge detecting part 51 outputs an edge detection signal.

Every time the edge detection signal is input from the encoder edge detecting part 51 to the position counter 52, the position counter 52 increments (namely, adds 1 (one) or decrements (namely, subtracts 1 (one) with respect to) an edge number count value in accordance with the rotating direction of the carriage motor 13 (namely, the moving direction of the carriage 12) detected by the encoder edge detecting part 51. The position counter 52 outputs position information indicating the edge number count value to the discharging timing pulse generator 54 and the signal processing part 55.

Every time the edge detection signal is input from the encoder edge detecting part 51 to the period counter 53, the period counter 53 initializes an edge period count value. Further, every time the clock signal is input from the clock generator 5 to the period counter 53, the period counter 53 increments the edge period count value.

Further, every time the edge detection signal is input from the encoder edge detecting part 51 to the period counter 53, the period counter 53 outputs, to the discharging timing pulse generator 54 and the signal processing part 55, time information indicating an edge period count value immediately before the edge detection signal is input. Namely, every time the edge detection signal is input from the encoder edge detecting part 51 to the period counter 53, the period counter 53 measures a time since the edge detection signal has been input the last time and until the edge detection signal is input this time.

The discharging timing pulse generator 54 is provided with a time storing part 61, an average time calculating part 62, a discharging time calculating part 63 and a pulse generator 64.

Every time the time information is input from the period counter 63 to the time storing part 61, the time storing part 61 stores the input time information in time series.

Every time new time information is stored in the time storing part 61, the average time calculating part 62 obtains a plurality of pieces of time information, among a plurality of pieces of the time information stored in the time storing part 61, of which number (quantity) is an average obtainment number previously set, in an order starting from time information, among the plurality of pieces of the time information stored in the time storing part 61, of which number is the average obtainment number, at a timing which is the most recent; and the average time calculating part 62 calculates, as a predicted period, an average indicated by the obtained time information of which number is the average obtainment number. The average obtainment number is an integer not less than 2 (two). In the present embodiment, the average obtainment number corresponds to a number (quantity) of the time information output by the period counter 53 during a period of time in which the carriage motor 13 makes one rotation.

Every time a new predicted period is calculated by the average time calculating part 62, the discharging time calculating part 63 calculates a divided value obtained by dividing a predicted period calculated most recently by an encoder multiplication number M, and makes the divided value to be a discharging time. In the present embodiment, the encoder multiplication number M is 4 (four).

After a predetermined delay time Td elapses since the input of the edge detection signal, the pulse generator 64 generates and outputs a first discharging timing pulse. Further, every time the discharging time calculated by the discharging time calculating part 63 elapses, the pulse generator 64 generates and outputs a 2nd discharging timing pulse to a M-th discharging timing pulse.

The signal processing part 55 processes a variety of kinds of signals such as the edge detection signal, the edge number count value, the edge period count value, etc., and outputs the processed signal(s) with respect to the CPU 2, as necessary. Further, the signal processing part 55 processes a variety of kinds of signals input thereto from the CPU 2, and outputs the processed signal(s) with respect to the respective parts in the inside of the recording encoder processing part 31.

The signal(s) input from the CPU 2 to the signal processing part 55 is exemplified, for example, a signal instructing whether or not the discharging timing pulse generator 54 generates the discharging timing pulse. In the image forming apparatus 1 of the present embodiment, it is not necessarily indispensable that the discharging timing pulse is required to be generated at all times; a time at which the discharging timing pulse is required (for example, at a time of image formation) and a time at which the discharging timing pulse is not required are present in a mixed manner. Due to this, the CPU 2 instructs the discharging timing pulse generator 54, via the signal processing part 55, as to whether or not the discharging timing pulse is to be generated.

The discharging timing pulse output from the discharging timing pulse generator 54 is input to the recording controller 16. The recording controller 16 uses the input discharging timing pulse as an operation timing of the recording head 11 (namely, an ink discharging timing) and controls the operation of the recording head 11.

Next, a method of generating the discharging timing pulse will be specifically explained.

Figure 5:
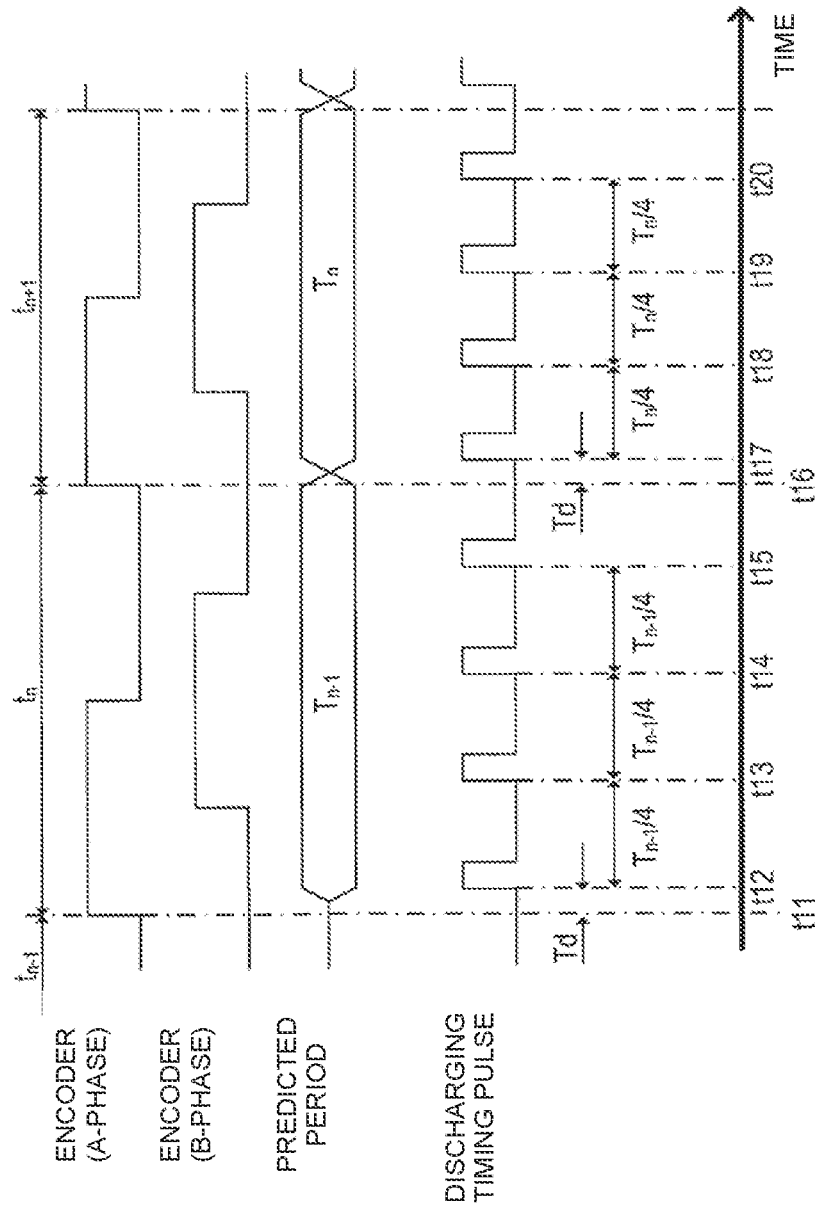
FIG. 5 is a view explaining a pulse generating method.

As depicted in FIG. 5, in a case that the rising edge of the A-phase signal is detected at a time t11, time information indicating a time tn−1 is input from the period counter 53 to the discharging timing pulse generator 54. The discharging timing pulse generator 54 calculates a predicted period Tn−1, by using the time information of which number (quantity) is the average obtainment number.

Further, the discharging timing pulse generator 54 generates and outputs the first discharging timing pulse at a time t12 at which the predetermined delay time Td elapses since the rising edge of the A-phase signal has been detected.

Furthermore, the discharging timing pulse generator 54 generates and outputs a second discharging timing pulse at a time t13 at which a time that is one-fourth the predicted period Tn−1 elapses since the first discharging timing pulse has been output.

Moreover, the discharging timing pulse generator 54 generates and outputs a third discharging timing pulse at a time t14 at which a time that is one-fourth the predicted period Tn−1 elapses since the second discharging timing pulse has been output.

Further, the discharging timing pulse generator 54 generates and outputs a fourth discharging timing pulse at a time t15 at which a time that is one-fourth the predicted period Tn−1 elapses since the third discharging timing pulse has been output.

Furthermore, in a case that the rising edge of the A-phase signal is detected at a time t16, time information indicating a time to is input from the period counter 53 to the discharging timing pulse generator 54. The discharging timing pulse generator 54 calculates a predicted period Tn, by using the time information of which number (quantity) is the average obtainment number.

Further, the discharging timing pulse generator 54 generates and outputs the first, second, third and fourth discharging timing pulses, respectively, at a time t17, a time t18, a time t19 and a time t20 at a time interval which is one-fourth the predicted period Tn, in a similar manner with respect to the times t12 to t15.

Next, an explanation will be given about a discharging timing in a case that the carriage motor rotation speed becomes to be greater than the reference rotation speed, due to the cogging.

Figure 6:
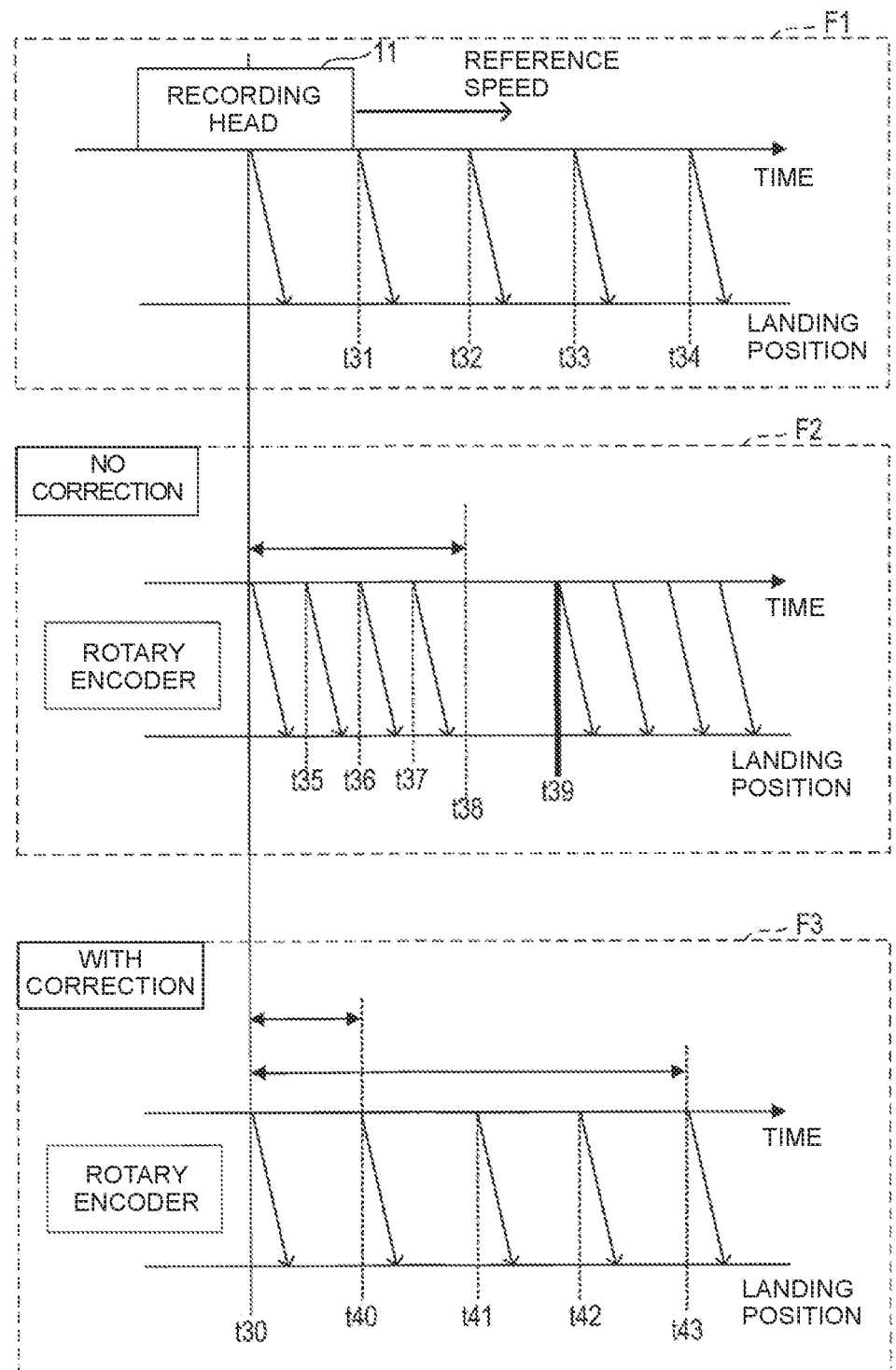
FIG. 6 is a view explaining a discharging timing in a case that a carriage motor rotation speed becomes to be greater than a reference rotation speed.

As depicted in FIG. 6, in a case that the recording head 11 is moving at the reference speed and that the carriage motor rotation speed is coincident with the reference rotation speed, it is assumed that the ink is discharged from the recording head 11 at each of a time t30, a time t31, a time t32, a time t33 and a time t34, as depicted by a view within a frame F1 of FIG. 6.

On the other hand, in a case that the recording head 11 is moving at the reference speed, that the carriage motor rotation speed becomes to be greater than the reference rotation speed and that the discharging timing pulse is generated based only on most recent time information, the ink is discharged from the recording head 11 at each of a time t30, a time t35, a time t36 and a time t37, as depicted by a view within a frame F2 of FIG. 6.

A time interval between the time t30 and the time t35 is shorter than a time interval between the time t30 and the time t31.

Note that a time t38 corresponds to a discharging timing predicted from a carriage motor rotation speed which is calculated most recently. Since the carriage motor rotation speed is greater than the reference rotation speed, the time t38 corresponding to the predicted discharging timing is earlier than the time t34 depicted by the view within the frame F1.

A time t39 depicted by the view within the frame F2 corresponds a timing at which the encoder edge detecting part 51 actually detects the edge. The reason that the timing at which the encoder edge detecting part 51 actually detects the edge is delayed with respect to the time t38 is that the carriage motor rotation speed is made slow due to the cogging.

Next, in a case that the recording head 11 is moving at the reference speed, that the carriage motor rotation speed becomes to be greater than the reference rotation speed and that the discharging timing pulse is generated based on the average of the time information of which number (quantity) is the average obtainment number, the ink is discharged from the recording head 11 at each of a time t30, a time t40, a time t41 and a time t42, as depicted by a view within a frame F3 of FIG. 6.

A time interval between the time t30 and the time t40 is substantially coincident with the time interval between the time t30 and the time t31.

Note that a time t43 corresponds to a discharging timing predicted from the average of the carriage motor rotation speed of which number (quantity) is the average obtainment number. The time t43 corresponding to the predicted discharging timing is substantially coincident with the time t34 depicted by the view within the frame F1 of FIG. 6.

Next, an explanation will be given about a discharging timing in a case that the carriage motor rotation speed becomes to be smaller than the reference rotation speed, due to the cogging.

Figure 7:
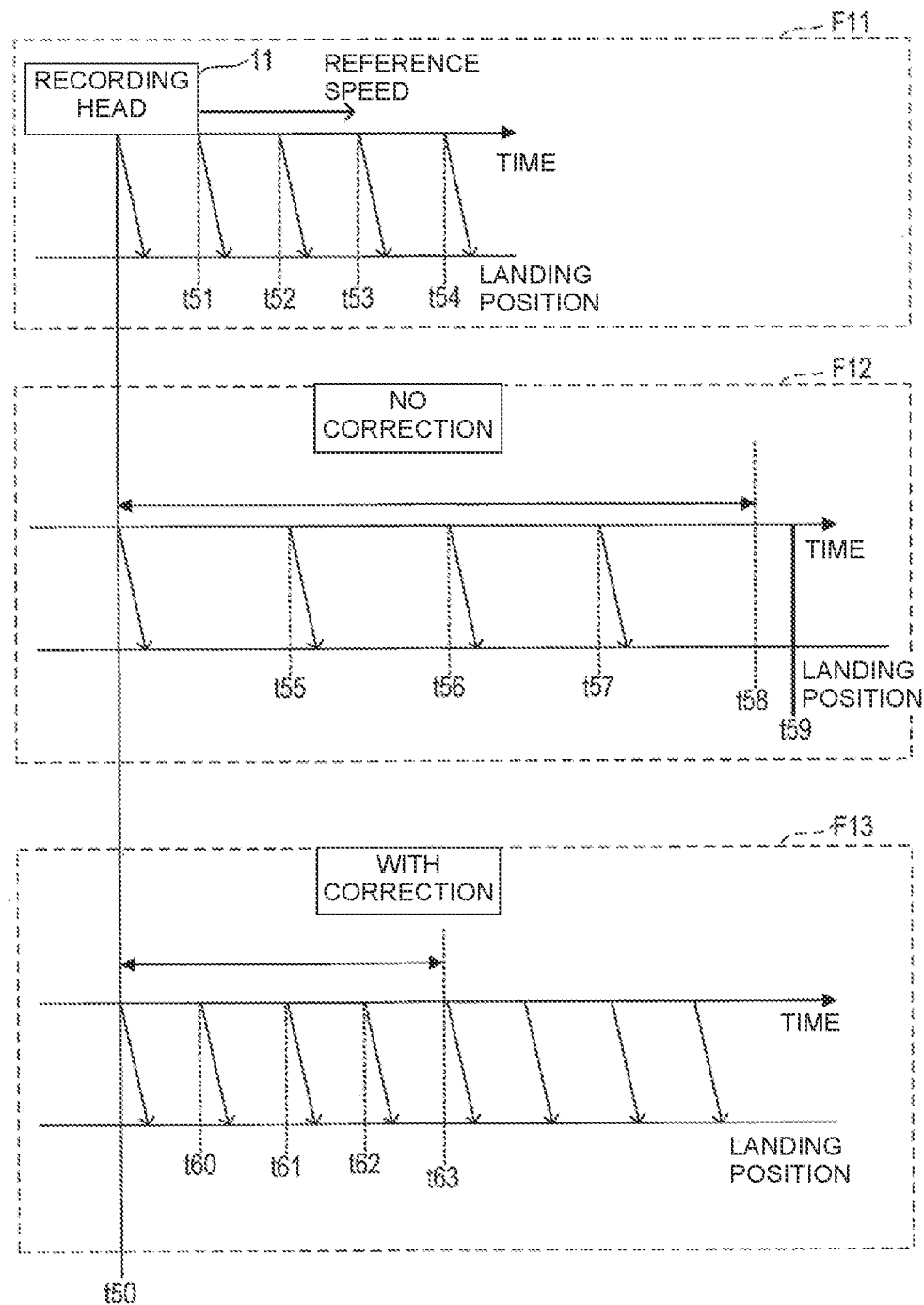
FIG. 7 is a view explaining a discharging timing in a case that the carriage motor rotation speed becomes to be smaller than the reference rotation speed.

As depicted in FIG. 7, in a case that the recording head 11 is moving at the reference speed and that the carriage motor rotation speed is coincident with the reference rotation speed, it is assumed that the ink is discharged from the recording head 11 at each of a time t50, a time t51, a time t52, a time t53 and a time t54, as depicted by a view within a frame F11 of FIG. 7.

Note that the time t54 corresponds to a discharging timing predicted from a carriage motor rotation speed which is calculated most recently. Since the recording head 11 is moving at the reference speed and the carriage motor rotation speed is coincident with the reference rotation speed, the ink is discharged at the time t54 which is coincident with the predicted discharging timing.

On the other hand, in a case that the recording head 11 is moving at the reference speed, that the carriage motor rotation speed becomes to be smaller than the reference rotation speed and that the discharging timing pulse is generated based only on the most recent time information, the ink is discharged from the recording head 11 at each of a time t50, a time t55, a time t56 and a time t57, as depicted by a view within a frame F12 of FIG. 7.

A time interval between the time t50 and the time t55 is longer than a time interval between the time t50 and the time 51.

Note that a time t58 corresponds to a discharging timing predicted from a carriage motor rotation speed which is calculated most recently. Since the carriage motor rotation speed is smaller than the reference rotation speed, the time t58 corresponding to the predicted discharging timing is later than the time t54 depicted by the view within the frame F11 of FIG. 7.

A time t59 depicted by the view within the frame F12 corresponds a timing at which the encoder edge detecting part 51 actually detects the edge. The reason that the timing at which the encoder edge detecting part 51 actually detects the edge is later than the time t58 is that the carriage motor rotation speed becomes to be slow due to the cogging.

Next, in a case that the recording head 11 is moving at the reference speed, that the carriage motor rotation speed becomes to be smaller than the reference rotation speed and that the discharging timing pulse is generated based on the average of the time information of which number (quantity) is the average obtainment number, the ink is discharged from the recording head 11 at each of a time t50, a time t60, a time t61 and a time t62, as depicted by a view within a frame F13 of FIG. 7.

A time interval between the time t50 and the time t60 is substantially coincident with the time interval between the time t50 and the time t51.

Note that a time t63 corresponds to a discharging timing predicted from the average of the carriage motor rotation speed of which number (quantity) is the average obtainment number. The time t63 corresponding to the predicted discharging timing is substantially coincident with the time t54 depicted by the view within the frame F11 of FIG. 7.

<Technical Effects>

The recording encoder processing part 31 configured as described above generates the discharging timing pulse based on the encoder signal obtained from the rotary encoder 14 configured to output the encoder signal every time the carriage motor 13 rotates by the predetermined amount.

The recording encoder processing part 31 is provided with the period counter 53 and the discharging timing pulse generator 54.

The period counter 53 is configured to calculate the time information, indicating the time interval between the encoder signal output most recently and the encoder signal output a previous time which is prior to the encoder signal output most recently, every time the encoder signal is output from the rotary encoder 14.

The discharging timing generator 54 is configured to determine the output timing, at which the timing pulse is output, based on at least two pieces of the time information.

Further, the time difference between the first calculating timing at which first time information is calculated and the second calculating timing at which second time information is calculated is longer than the time required for the carriage motor 13 to rotate by not less than the angle corresponding to the cogging distance. The first time information is the time information, of the at least two pieces of the time information, output based on the encoder signal which is output the earliest and the second time information is the time information, of the at least two pieces of the time information, output based on a second detection signal which is output the latest.

The cogging distance is a value obtained by dividing an angle required for the carriage motor 13 to make one rotation (namely, 360 degrees) with a product of a number (quantity) of a magnet of a stator of the carriage motor 13 and a division number by which a rotor of the carriage motor 13 is divided.

For example, it is assumed that the number of the magnet of the stator of the carriage motor 13 is "3" and that the division number of the rotor is "4". Note that in a case that the rotor is constructed of two N-poles and two S-poles, the division number of the rotor is "4". The cogging distance in this case is: 360/(3×4)=30 degrees.

In a case that the timing pulse, indicating the discharging timing at which the recording head 11 that is moved by the carriage 12 driven by the carriage motor 13 discharges the ink toward the sheet, is generated, since the recording encoder processing part 31 configured in such a manner is capable of suppressing the deviation in the discharging timing due to the cogging fluctuation of the carriage motor 13 and of suppressing the generation of the printing unevenness, it is possible to improve the quality of the image of the image forming apparatus 1.

The recording encoder processing part 31 determines the output timing based on the average of the at least two pieces of the time information. The recording encoder processing part 31 configured in such a manner is capable of simplifying the determination of the output timing, thereby making it possible to lower the processing load of the recording encoder processing part 31.

Further, the recording encoder processing part 31 determines the output timing so that the output timing is determined at a regular interval within an average time indicating the average of the at least two pieces of the time information. The recording encoder processing part 31 configured in such a manner is capable of simplifying the determination of the output timing, thereby making it possible to lower the processing load of the recording encoder processing part 31.

Furthermore, the time difference between the first calculating timing and the second calculating timing is same as the time required for the carriage motor 13 to make one rotation (rotate one time). The recording encoder processing part 31 configured in such a manner is capable of lowering the effect of the cogging fluctuation further than in a case that the time difference between the first calculating timing and the second calculating timing is shorter than the time required for the carriage motor 13 to make one rotation.

In the embodiment as explained above, the recording encoder processing part 31 corresponds to a "pulse generator", the carriage motor 13 corresponds to a "motor", the encoder signal corresponds to a "detection signal", the rotary encoder 14 corresponds to a "detection signal outputting part" and the discharging timing pulse corresponds to a "timing pulse".

Further, the period counter 53 corresponds to a "time information calculating part", the discharging timing pulse generator 54 corresponds to a "timing determining part", the encoder signal which is output the earliest corresponds to a "first detection signal", and the encoder signal which is output the latest corresponds to a "second detection signal".

SECOND EMBODIMENT

In the following, a second embodiment of the present disclosure will be explained, together with the drawing. Note that in the second embodiment, a part different from that of the first embodiment will be explained. A configuration of the second embodiment which is common to that of the first embodiment is designated by the same reference numeral.

An image forming apparatus 1 of the second embodiment is different from that of the first embodiment in view of that the configuration of the discharging timing pulse generator 54 is changed.

Figure 8:
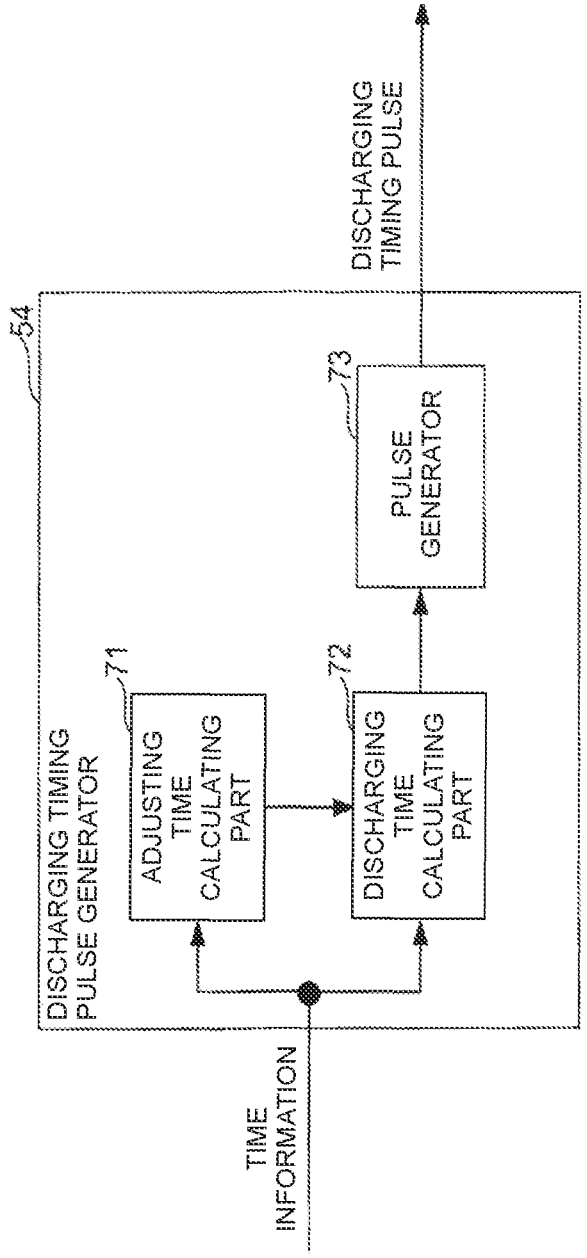
FIG. 8 is a block diagram depicting the configuration of a discharging timing pulse generator.

As depicted in FIG. 8, the discharging timing pulse generator 54 of the second embodiment is provided with an adjusting time calculating part 71, a discharging time calculating part 72 and a pulse generator 73.

The adjusting time calculating part 71 calculates a first adjusting time delay 1, a second adjusting time delay 2 . . . a M-th adjusting time delay M, every time the time information is input thereto from the period counter 53.

Note that the adjusting time calculating part 71 calculates a N-th adjusting time delay N with Formula 1. In Formula 1, "N" is an integer in a range of 1 (one) to M. In Formula 1, "Ts" corresponds to a period by which the A-phase signal is output from the rotary encoder 22 in a case that the carriage motor 13 rotates at the reference rotation speed.

$$\text{delay } N=(N-1)\times(Ts-Te)/M \qquad \text{<Formula 1>}$$

Every time the period counter 53 inputs time information to the discharging time calculating part 72, the discharging time calculating part 72 uses a time indicated by the input time information (namely, a predicted time Te) and the 1st to M-th adjusting times delay 1 to delay M input from the adjusting time calculating part 71 so as to calculate a N-th discharging time ET_N of a N-th discharging timing pulse with Formula 2.

$$ET\_N=(N-1)\times Te/M+\text{delay } N \qquad \text{<Formula 2>}$$

After a predetermined delay time Td elapses since the input of the edge detection signal, the pulse generator 73 generates and outputs the first discharging timing pulse. Further, after the N-th discharging time ET_N elapses since the pulse generator 73 has output the first discharging timing pulse, the pulse generator 73 generates and outputs the N-th discharging timing pulse. The "N" here is an integer in a range of 2 (two) to M.

Next, an explanation will be given about a discharging timing in a case that the carriage motor rotation speed becomes to be greater than the reference rotation speed, due to the cogging.

Figure 9:
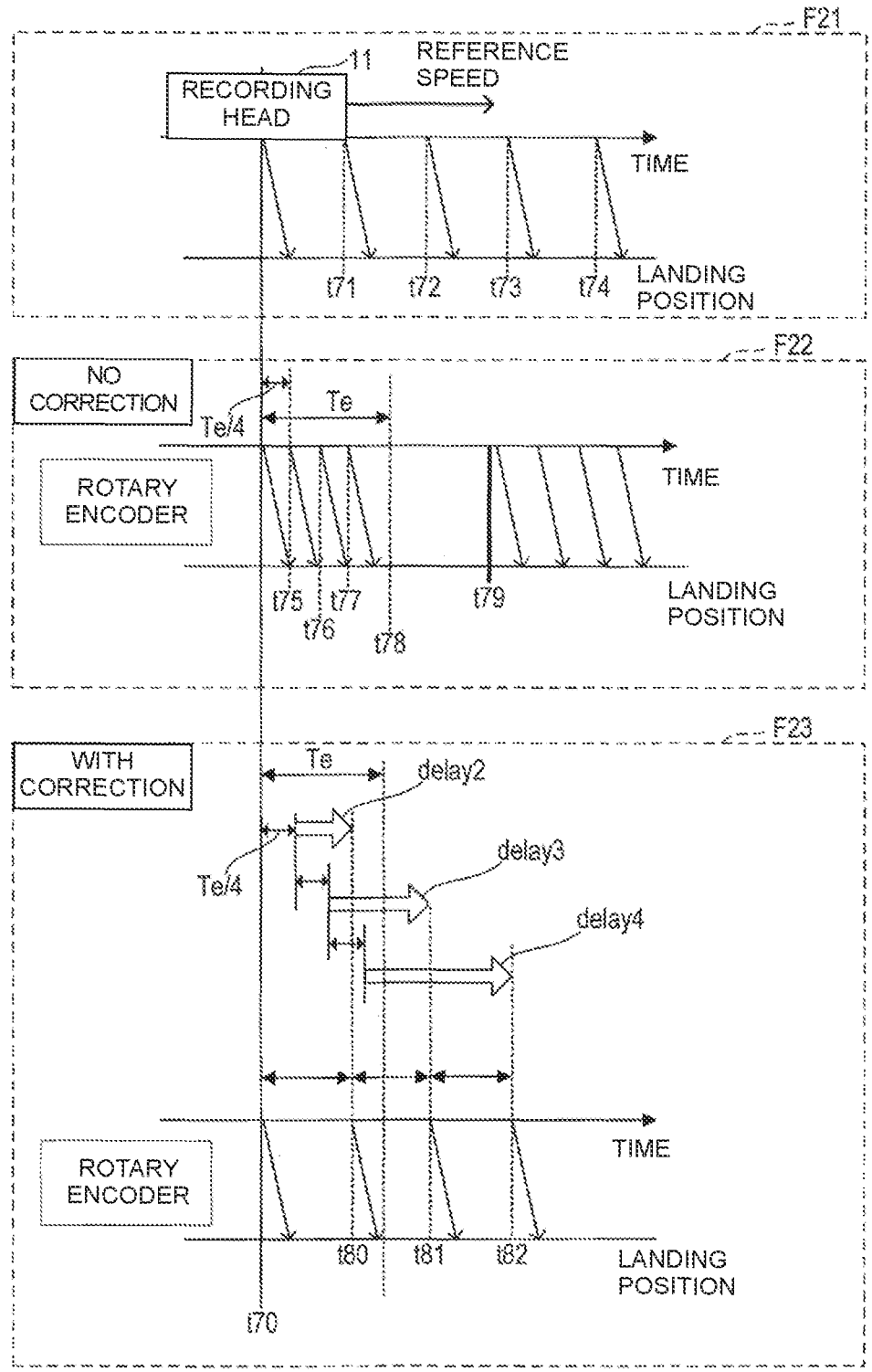
FIG. 9 is a view explaining a discharging timing in a case that the carriage motor rotation speed becomes to be greater than the reference rotation speed.

As depicted in FIG. 9, in a case that the recording head 11 is moving at the reference speed and that the carriage motor rotation speed is coincident with the reference rotation speed, it is assumed that the ink is discharged from the recording head 11 at each of a time t70, a time t71, a time t72, a time t73 and a time t74, as depicted by a view within a frame F21 of FIG. 9.

On the other hand, in a case that the recording head 11 is moving at the reference speed, that the carriage motor rotation speed becomes to be greater than the reference rotation speed and that the discharging timing pulse is generated based only on the most recent time information, the ink is discharged from the recording head 11 at each of a time t70, a time t75, a time t76 and a time t77, as depicted by a view within a frame F22 of FIG. 9.

A time interval between the time t70 and the time t75 is shorter than a time interval between the time t70 and the time t71.

Note that a time t78 corresponds to a discharging timing predicted from a carriage motor rotation speed which is calculated most recently. Since the carriage motor rotation speed is greater than the reference rotation speed, the time t78 corresponding to the predicted discharging timing is earlier than the time t74 depicted by the view within the frame F21.

A time t79 depicted by the view within the frame F22 corresponds a timing at which the encoder edge detecting part 51 actually detects the edge. The reason that the timing at which the encoder edge detecting part 51 actually detects the edge is delayed with respect to the time t78 is that the carriage motor rotation speed is made slow due to the cogging.

Next, in a case that the recording head 11 is moving at the reference speed, that the carriage motor rotation speed becomes to be greater than the reference rotation speed and that the discharging timing pulse is generated based on the adjusting time, the ink is discharged from the recording head 11 at each of a time t70, a time t80, a time t81 and a time t82, as depicted by a view within a frame F23 of FIG. 9.

The time t80 corresponds to a second discharging time ET_2. The time t81 corresponds to a third discharging time ET_3. The time t82 corresponds to a fourth discharging time ET_4.

Next, an explanation will be given about a discharging timing in a case that the carriage motor rotation speed becomes to be smaller than the reference rotation speed, due to the cogging.

Figure 10:
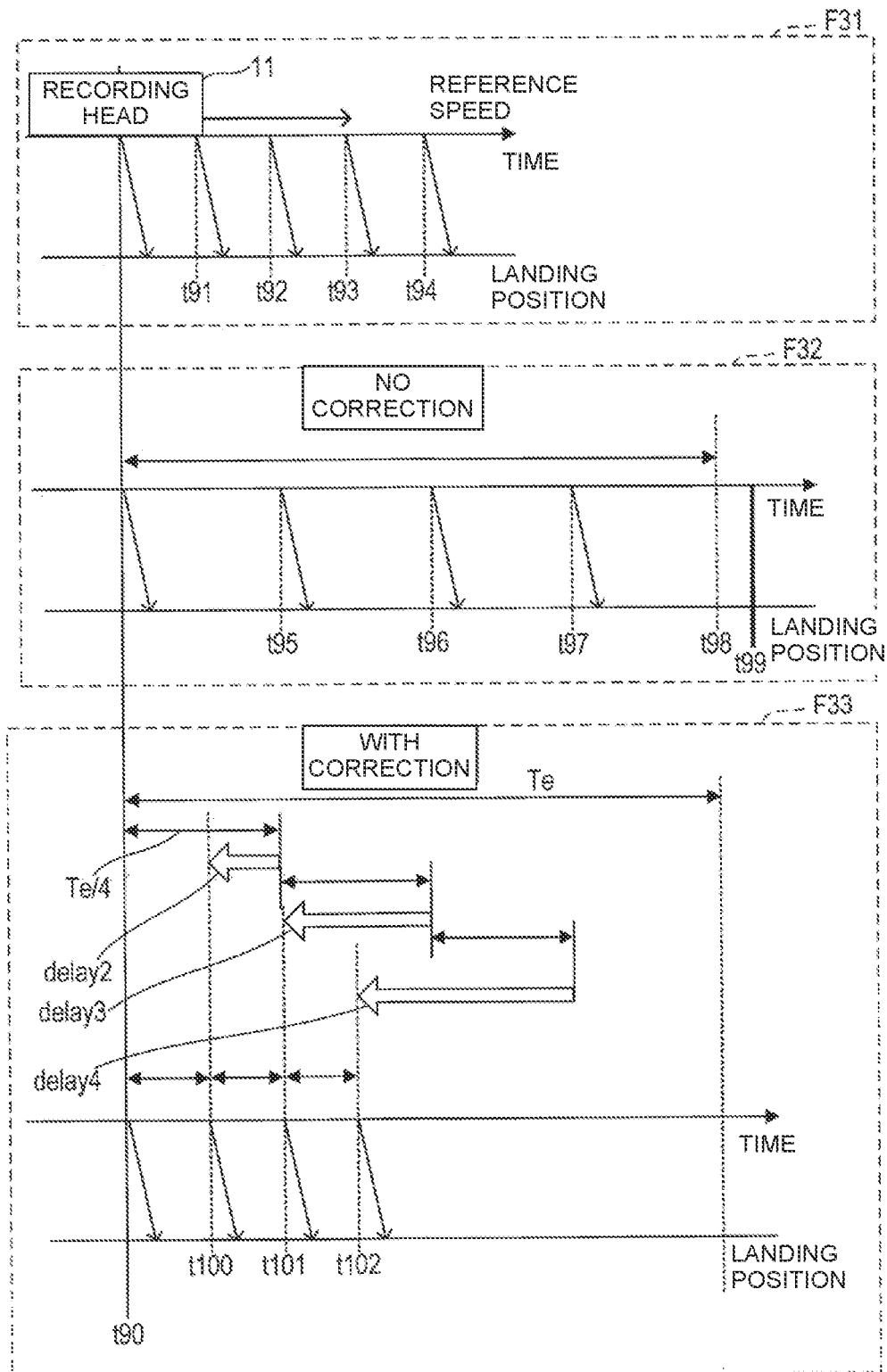
FIG. 10 is a view explaining a discharging timing in a case that the carriage motor rotation speed becomes to be smaller than the reference rotation speed.

As depicted in FIG. 10, in a case that the recording head 11 is moving at the reference speed and that the carriage motor rotation speed is coincident with the reference rotation speed, it is assumed that the ink is discharged from the recording head 11 at each of a time t90, a time t91, a time t92, a time t93 and a time t94, as depicted by a view within a frame F31 of FIG. 10.

On the other hand, in a case that the recording head 11 is moving at the reference speed, that the carriage motor rotation speed becomes to be smaller than the reference rotation speed and that the discharging timing pulse is generated based only on the most recent time information, the ink is discharged from the recording head 11 at each of a time t90, a time t95, a time t96 and a time t97, as depicted by a view within a frame F32 of FIG. 10.

A time interval between the time t90 and the time t95 is longer than a time interval between the time t90 and the time t91.

Note that a time t98 corresponds to a discharging timing predicted from a carriage motor rotation speed which is calculated most recently. Since the carriage motor rotation speed is smaller than the reference rotation speed, the time t98 corresponding to the predicted discharging timing is later than the time t94 depicted by the view within the frame F31.

A time t99 depicted by the view within the frame F32 corresponds a timing at which the encoder edge detecting part 51 actually detects the edge. The reason that the timing at which the encoder edge detecting part 51 actually detects the edge is delayed with respect to the time t98 is that the carriage motor rotation speed is made slow due to the cogging.

Next, in a case that the recording head 11 is moving at the reference speed, that the carriage motor rotation speed becomes to be smaller than the reference rotation speed and that the discharging timing pulse is generated based on the adjusting time, the ink is discharged from the recording head 11 at each of a time t90, a time t100, a time t101 and a time t102, as depicted by a view within a frame F33 of FIG. 10.

The time t100 corresponds to the second discharging time ET_2. The time t101 corresponds to the third discharging time ET_3. The time t102 corresponds to the fourth discharging time ET_4.

The recording encoder processing part 31 configured in such a manner is provided with the period counter 53 and the discharging timing pulse generator 54.

The discharging timing pulse generator 54 calculates first to M-th adjusting times delay 1 to delay M by using time information before the discharging timing pulse is generated (hereinafter referred to as "most recent time information") and reference time information which is a reference of a time interval and which is previously set (namely, information indicating a time Ts), the discharging timing pulse being generated at the time interval. Further, the discharging timing pulse generator 54 determines the output timing, at which the discharging timing pulse is output, by delaying or advancing, based on the first to the M-th adjusting time delay 1 to delay M, the output timing with respect to a reference output timing which is calculated based on the most recent time information and which is a reference of the output timing. Note that the most recent time information is the time information indicating the predicted time Te. The reference output timing is a timing specified by: $(N-1) \times Te/M$.

In a case that the discharging timing pulse indicating the discharging timing at which the recording head 11 that is moved by the carriage 12 driven by the carriage motor 13 discharges the ink toward the sheet is generated, since the recording encoder processing part 31 configured in such a manner is capable of suppressing any deviation in the discharging timing caused due to the cogging fluctuation of the carriage motor 13 and of suppressing the generation of the printing unevenness, it is possible to improve the quality of the image of the image forming apparatus 1.

Further, the discharging timing pulse generator 54 is configured to determine a plurality of pieces of the output timing during a period of time since the encoder signal has been output most recently and until the encoder signal is output next time. Furthermore, the discharging timing pulse generator 54 determines the plurality of pieces of the output timing based on the first to M-th adjusting times delay 1 to delay M each of which is calculated independently from each other with respect to one of the plurality of pieces of the output timing. The recording encoder processing part 31 configured in such a manner calculates the first to M-th adjusting times delay 1 to delay M each of which is calculated independently from each other, and thus is capable of suppressing any lowering in the image quality.

In the second embodiment as explained above, the carriage motor 13 corresponds to a "driving object", the 1st to M-th adjusting times delay 1 to delay M correspond to an "adjusting time" and the reference rotation speed corresponds to a "reference speed".

THIRD EMBODIMENT

In the following, a third embodiment of the present disclosure will be explained, together with the drawings. Note that in the third embodiment, a part different from that of the first embodiment will be explained. A configuration of the third embodiment which is common to that of the first embodiment is designated by the same reference numeral.

An image forming apparatus 1 of the third embodiment is different from that of the first embodiment in view of that the configuration of the discharging timing pulse generator 54 is changed.

Figure 11:
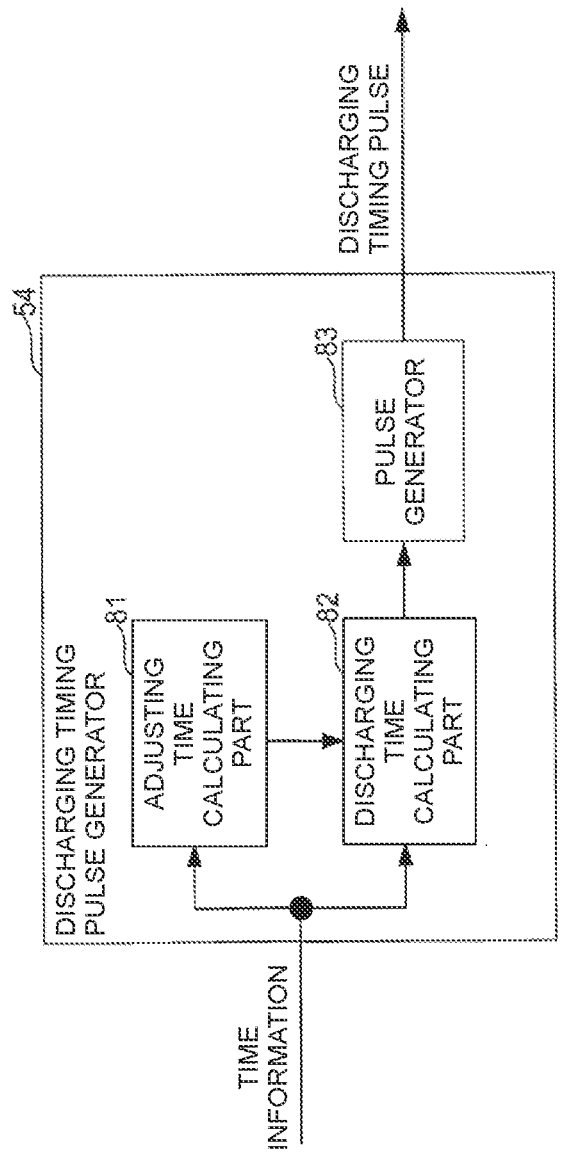
FIG. 11 is a block diagram depicting the configuration of the discharging timing pulse generator.

As depicted in FIG. 11, the discharging timing pulse generator 54 of the third embodiment is provided with an adjusting time calculating part 81, a discharging time calculating part 82 and a pulse generator 83.

Every time the time information is input from the period counter 53 to the adjusting time calculating part 81, the adjusting time calculating part 81 calculates an adjusting time delay by Formula 3.

$$\text{delay}=(Ts-Te)/2 \qquad \text{<Formula 3>}$$

Every time the time information is input from the period counter 53 to the discharging time calculating part 82, the discharging time calculating part 82 uses time indicated by the input time information (namely, a predicted time Te) and the adjusting time delay input from the adjusting time calculating part 81 so as to calculate a N-th discharging time ET_N of a N-th discharging timing pulse with Formula 4.

$$ET\_N = Td + (N-1) \times Te/M + \text{delay} \qquad \text{<Formula 4>}$$

After the N-th discharging time ET_N elapses since the input of the edge detection signal, the pulse generator 83 generates and outputs the N-th discharging timing pulse.

Next, an explanation will be given about a discharging timing in a case that the carriage motor rotation speed becomes to be greater than the reference rotation speed, due to the cogging.

Figure 12:
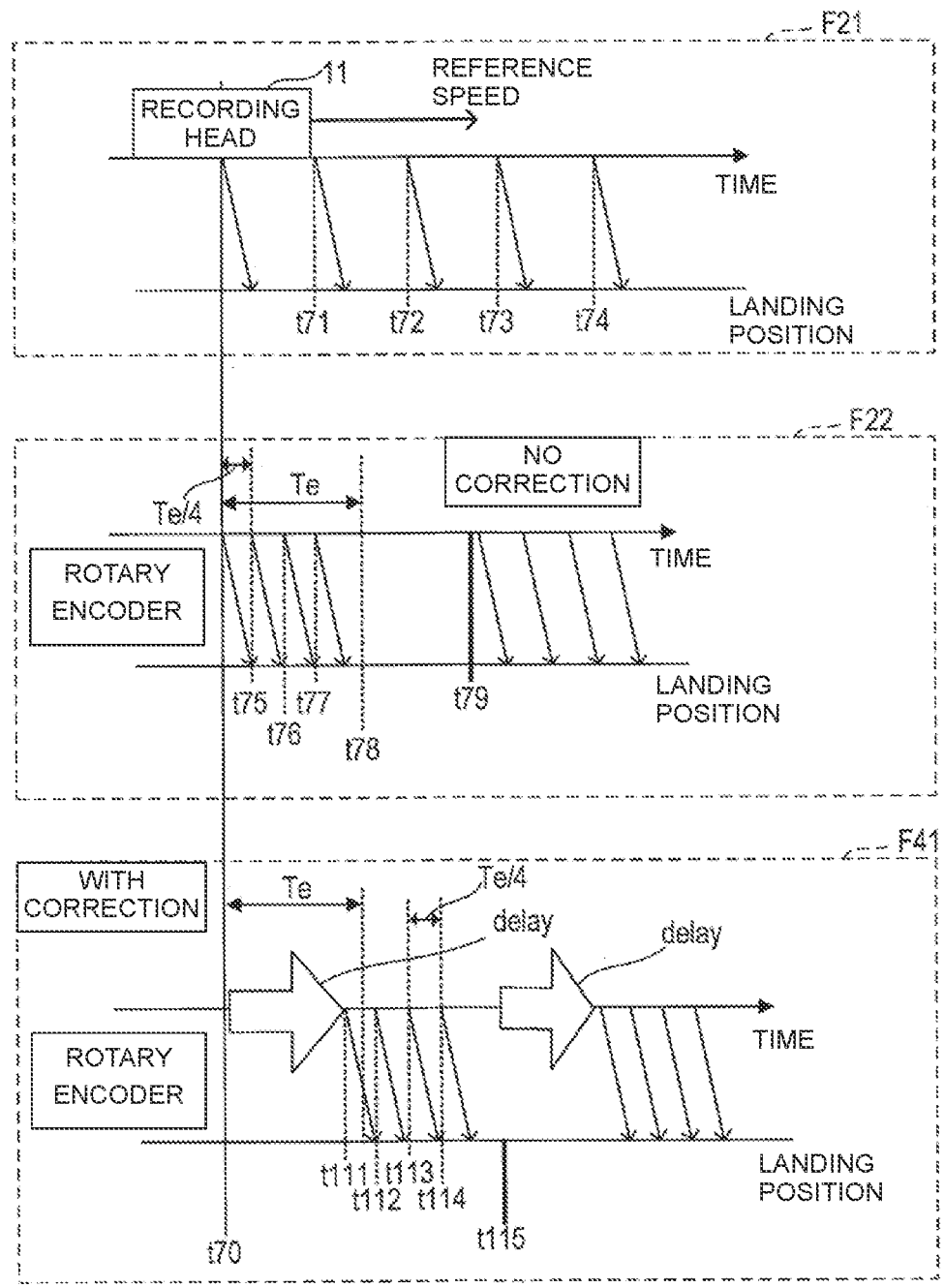
FIG. 12 is a view explaining a discharging timing in a case that the carriage motor rotation speed becomes to be greater than the reference rotation speed.

As depicted in FIG. 12, the views in frames F21 and F22 in FIG. 12 are same as those in FIG. 9, any explanation thereof will be omitted.

In a case that the recording head 11 is moving at the reference speed, that the carriage motor rotation speed becomes to be greater than the reference rotation speed and that the discharging timing pulse is generated based the adjusting time, the ink is discharged from the recording head 11 at each of a time t111, a time t112, a time t113 and a time t114, as depicted by a view within a frame F41 of FIG. 12.

The time t111 corresponds to the first discharging time ET_1. The time t112 corresponds to the second discharging time ET_2. The time t113 corresponds to the third discharging time ET_3. The time t114 corresponds to the fourth discharging time ET_4.

Note that a time t115 corresponds a timing at which a next edge detection signal is input. Namely, the ink is discharged from the recording head 11 every time each of newly calculated first, second, third and fourth discharging times ET_1, ET_2, ET_3 and ET_4 elapses since the time t115.

Next, an explanation will be given about a discharging timing in a case that the carriage motor rotation speed becomes to be smaller than the reference rotation speed, due to the cogging.

Figure 13:
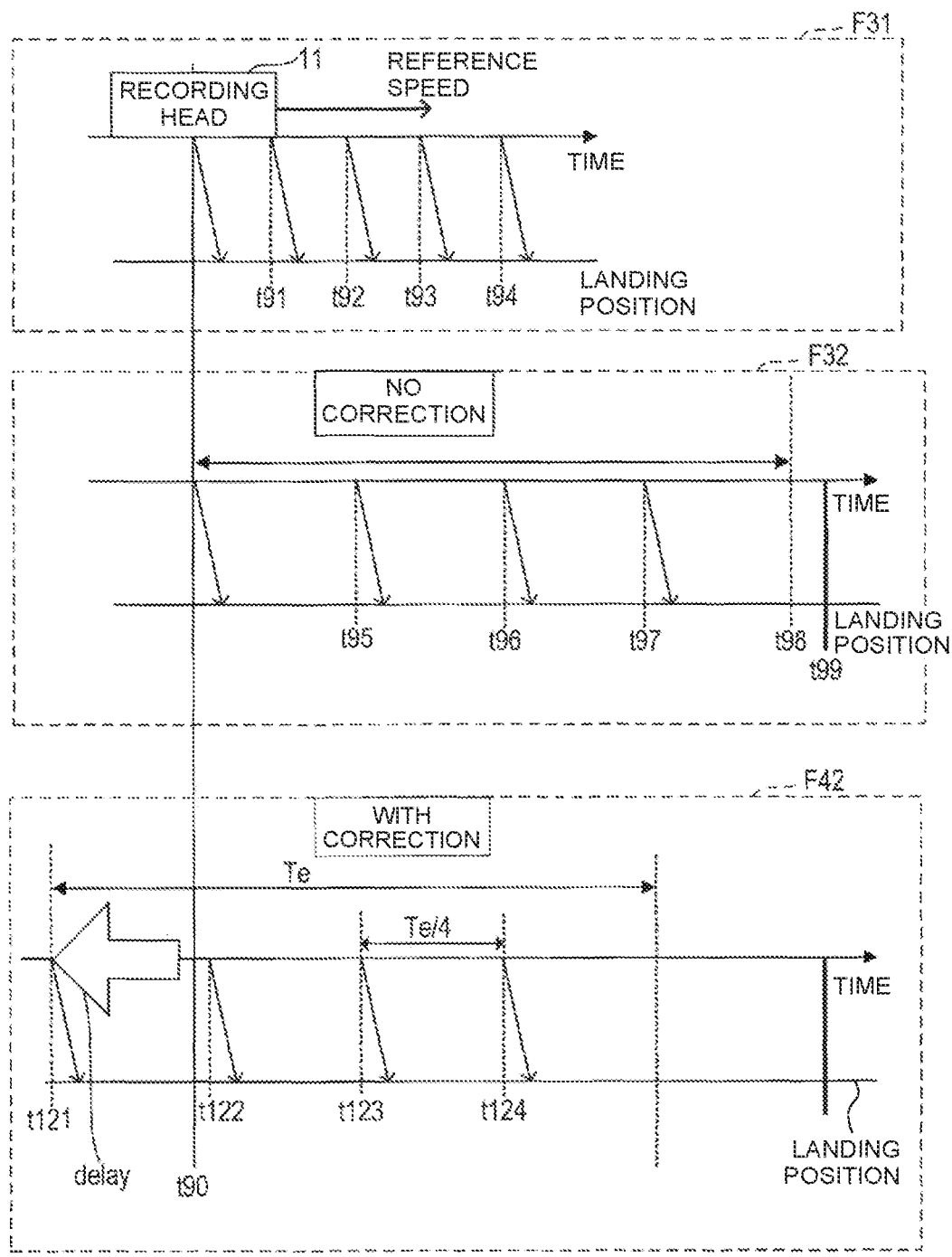
FIG. 13 is a view explaining a discharging timing in a case that the carriage motor rotation speed becomes to be smaller than the reference rotation speed.

As depicted in FIG. 13, the views in frames F31 and F32 in FIG. 13 are same as those in FIG. 10, any explanation thereof will be omitted.

In a case that the recording head 11 is moving at the reference speed, that the carriage motor rotation speed becomes to be smaller than the reference rotation speed and that the discharging timing pulse is generated based the adjusting time, the ink is discharged from the recording head 11 at each of a time t121, a time t122, a time t123 and a time t124, as depicted by a view within a frame F42 of FIG. 13.

The time t121 corresponds to the first discharging time ET_1. The time t122 corresponds to the second discharging time ET_2. The time t123 corresponds to the third discharging time ET_3. The time t124 corresponds to the fourth discharging time ET_4.

The recording encoder processing part 31 configured in such a manner determines a plurality of output timings based on a same adjusting time delay which is same or common with respect to the plurality of output timings. The recording encoder processing part 31 configured in such a manner is capable of simplifying the determination of the output timing, thereby making it possible to lower the processing load of the recording encoder processing part 31.

In the third embodiment as described above, the adjusting time delay corresponds to the "adjusting time".

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Although the embodiments of the present disclosure have been explained in the foregoing, the present disclosure is not limited to or restricted by the embodiments; the present disclosure may be carried out while being changed or modified in a variety of kinds of manners.

[First Modification]

The above-described embodiments each indicate an aspect wherein the time information is a clock number required for the carriage motor 13 to make the rotation by a predetermined amount. It is allowable, however, that the time information is information indicating a time required for the carriage motor 13 to make the rotation by the predetermined amount.

[Second Modification]

The above-described embodiments each indicate an aspect wherein the discharging timing pulse of which number (quantity) is the encoder multiplication number M, every time the encoder signal is detected. It is allowable, however, that the discharging timing pulse generator 54 is configured to continuously set the discharging timing pulse at an equal interval, until the discharging timing pulse which is generated based on a newly detected encoder signal is output. Since the recording encoder processing part 31 configured in such a manner is capable of suppressing the occurrence of such a situation that the output of the discharging timing pulse is interrupted, thereby making it possible to suppress any lowering in the image quality.

[Third Modification]

The above-described embodiments each indicate an aspect wherein the reference time information is the time or the clock number required for the carriage motor 13 to rotate by the predetermined amount in the case that the carriage motor 13 is rotary driven at the reference rotation speed which is previously set. It is allowable, however, that the reference time information is a time or a clock number obtained by averaging at least two pieces of time information, which are calculated before the output timing is determined, or a time or a clock number obtained by using at least two pieces of time information and by performing calculation therefor with the least squares method.

It is allowable that a plurality of functions possessed by one constituent component in the above-described embodiment(s) is realized by a plurality of constituent components, or that one function possessed by one constituent component is realized by a plurality of constituent components. Alternatively, it is also allowable that a plurality of functions possessed by a plurality of constituent components is realized by one constituent component, or that one function realized by a plurality of constituent components is realized by one constituent component. Further, it is also allowable that a part of the configuration of the above-described embodiment(s) may be omitted. Furthermore, it is also allowable that at least a part of the configuration of the above-described embodiment is added to or replaced with respect to another configuration of the above-described embodiment.

Other than the recording encoder processing part 31 as described above, the present disclosure may be realized by a variety of kinds of aspects such as, for example, a system having the recording encoder processing part 31 as a constituent component thereof, a program for causing a computer to function as the recording encoder processing part 31, a non-transition physical recording medium such as a semiconductor memory storing the program, etc., a pulse-generating method, etc.

What is claimed is:

1. A pulse generator configured to generate a timing pulse based on a detection signal obtained from a detection signal outputting part configured to output the detection signal every time a motor rotates by a predetermined amount which has been previously set, the pulse generator comprising:
  a time information calculating part configured to calculate time information, indicating a time interval between the detection signal output most recently and the detection signal output a previous time which is prior to the detection signal output most recently, every time the detection signal is output from the detection signal outputting part; and
  a timing determining part configured to determine an output timing, at which the timing pulse is output, based on at least two pieces of the time information, wherein
  a time difference between a first calculating timing at which first time information is calculated and a second calculating timing at which second time information is calculated is longer than a time required for the motor to rotate by not less than an angle corresponding to a cogging distance, with the first time information being the time information, of the at least two pieces of the time information, output based on a first detection signal and the second time information being the time information, of the at least two pieces of the time information, output based on a second detection signal, wherein the first detection signal is an output before the second detection signal.

2. The pulse generator according to claim 1, wherein the time information is a time or a clock number required for the motor to rotate by the predetermined amount.

3. The pulse generator according to claim 1, wherein the timing determining part is configured to determine the output timing based on an average of the at least two pieces of the time information.

4. The pulse generator according to claim 3, wherein the timing determining part is configured to determine the output timing so that the output timing is determined at a regular interval within an average time indicating the average of the at least two pieces of the time information.

5. The pulse generator according to claim 4, wherein the timing determining part is configured to set the output timing at the regular interval continuously until the timing pulse generated based on the detection signal which is newly detected is output.

6. The pulse generator according to claim 1, wherein the time difference between the first calculating timing and the second calculating timing is equal to a time required for the motor to make one rotation.

7. A pulse generator configured to generate a timing pulse based on a detection signal obtained from a detection signal outputting part configured to output the detection signal every time a driving object moves by a predetermined amount which has been previously set, the pulse generator comprising:
- a time information calculating part configured to calculate time information, indicating a time interval between the detection signal output most recently and the detection signal output a previous time which is prior to the detection signal output most recently, every time the detection signal is output from the detection signal outputting part; and
- a timing adjusting part configured to calculate an adjusting amount by using most recent time information which is the time information before the timing pulse is generated and reference time information which is a reference of a time interval and which has been previously set, the timing pulse being generated at the time interval, and configured to determine an output timing at which the timing pulse is output, by delaying or advancing, based on the adjusting amount, the output timing with respect to a reference output timing which is calculated based on the most recent time information and which is a reference of the output timing.

8. The pulse generator according to claim 7, wherein the time information is a time or a clock number required for the driving object to move by the predetermine predetermined amount.

9. The pulse generator according to claim 7, wherein the reference time information is a time or a clock number required for the driving object to move by the predetermined amount in a case that the driving object is driven at a reference speed which has been previously set.

10. The pulse generator according to claim 7, wherein the reference time information is a time or a clock number obtained by averaging at least two pieces of the time information which are calculated before the output timing is determined.

11. The pulse generator according to claim 7, wherein the timing adjusting part is configured to determine a plurality of pieces of the output timing during a period of time since the detection signal has been output most recently and until the detection signal is output next time, and
the timing adjusting part is configured to determine the plurality of pieces of the output timing based on a plurality of pieces of the adjusting amount each of which is calculated independently with respect to one of the plurality of pieces of the output timing.

12. The pulse generator according to claim 11, wherein in a case that a number of the timing pulse to be output during the period of time since the detection signal has been output most recently and until the detection signal is detected the next time is M, that a time indicated by the time information is Te, that a time indicated by the reference time information is Ts and that the adjusting amount of the output timing which is output as a N-th output timing is delay N, the timing adjusting part is configured to calculate the adjusting amount of the N-th output timing by:

delay $N=(N-1)\times(Ts-Te)/M$.

13. The pulse generator according to claim 7, wherein the timing adjusting part is configured to determine a plurality of pieces of the output timing during a period of time since the detection signal has been output most recently and until the detection signal is output next time, and
the timing adjusting part is configured to determine the plurality of pieces of the output timing based on the adjusting amount which is same with respect to the plurality of pieces of the output timing.

14. The pulse generator according to claim 13, wherein in a case that a time indicated by the time information is Te, that a time indicated by the reference time information is Ts and that the adjusting amount is delay, the timing adjusting part is configured to calculate the adjusting amount by:

delay=$(Ts-Te)/2$.

15. The pulse generator according to claim 1, wherein the motor drives a conveying apparatus configured to move a discharging apparatus which is configured to discharge an ink toward a sheet, and
the timing pulse indicates a timing at which the ink is discharged by the discharging apparatus.

16. The pulse generator according to claim 7, wherein the driving object drives a conveying apparatus configured to move a discharging apparatus which is configured to discharge an ink toward a sheet, and
the timing pulse indicates a timing at which the ink is discharged by the discharging apparatus.

* * * * *